March 26, 1940.  J. A. EDEN  2,195,026
BORING DEVICE
Filed Dec. 24, 1937   2 Sheets-Sheet 1
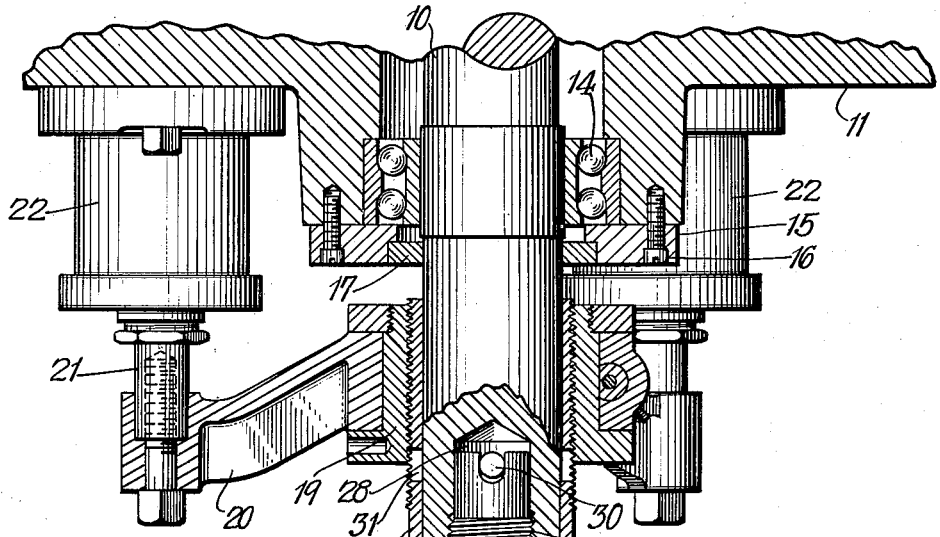
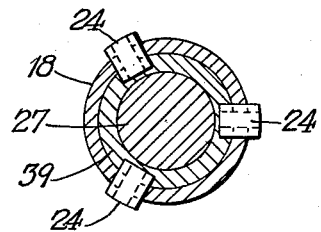
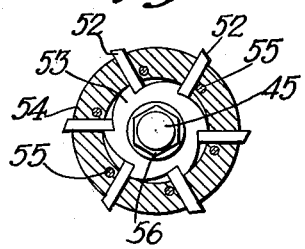
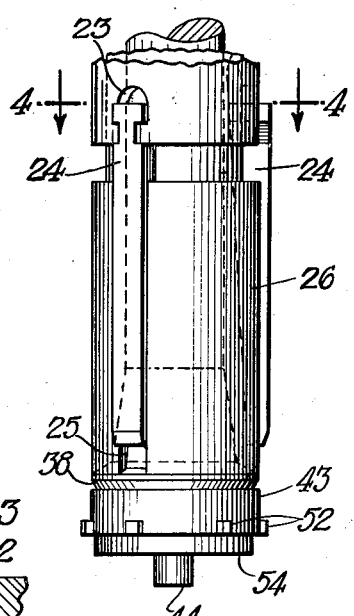
INVENTOR
JAMES A. EDEN.
BY Benj' T. Rauber
ATTORNEY March 26, 1940.   J. A. EDEN   2,195,026
BORING DEVICE
Filed Dec. 24, 1937   2 Sheets-Sheet 2
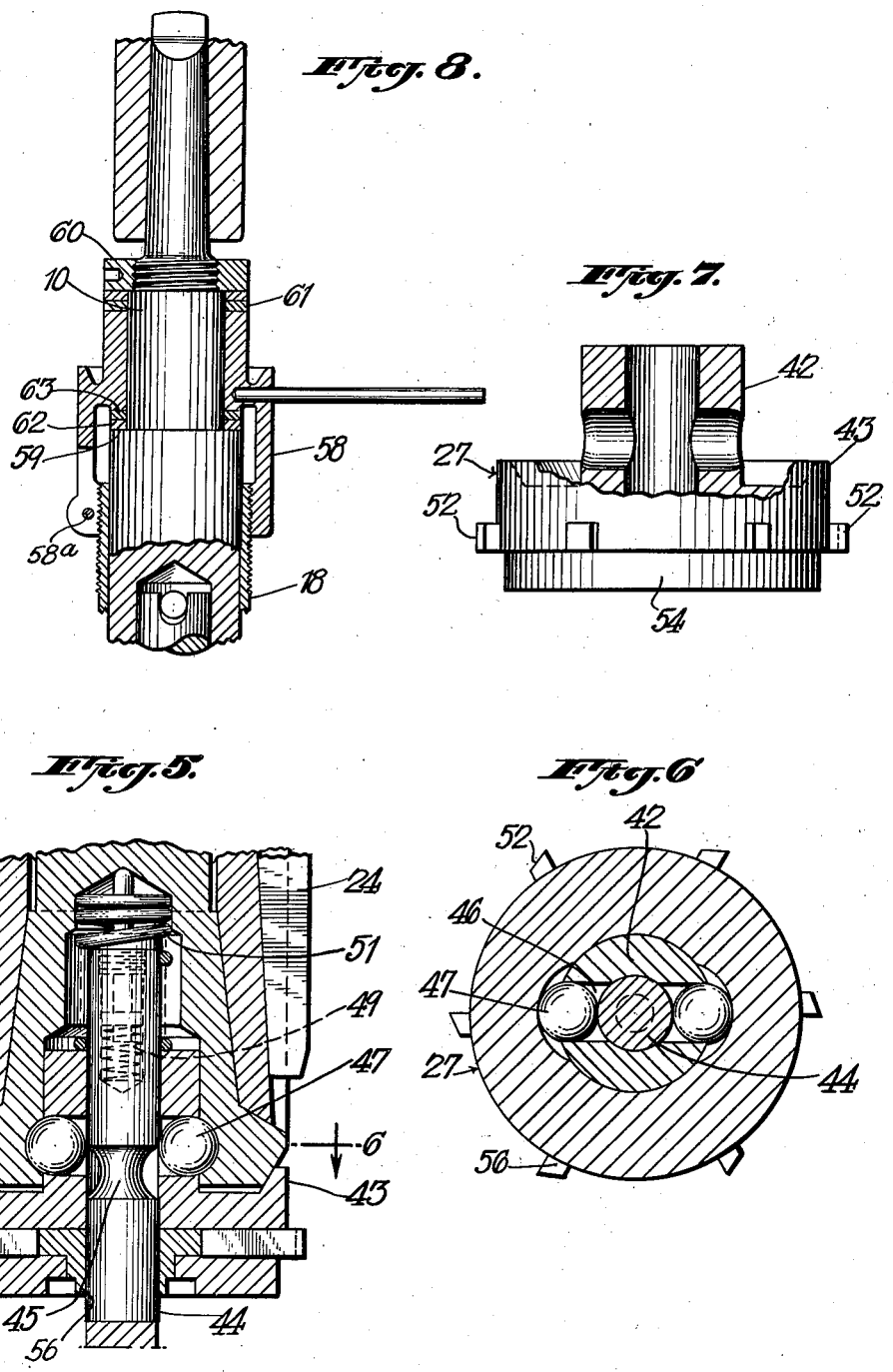
INVENTOR
*James A. Eden.*
BY *Benj. T. Rauber*
ATTORNEY Patented Mar. 26, 1940

2,195,026

UNITED STATES PATENT OFFICE 2,195,026

BORING DEVICE

James A. Eden, Springfield, Mass., assignor to Baush Machine Tool Company, Springfield, Mass., a corporation of Massachusetts Application December 24, 1937, Serial No. 181,487

3 Claims. (Cl. 77—55)

My present invention relates to a boring device for boring out the interior surface of a cylindrical opening or passage as for example the cylinder of an engine.

In boring the inner surface of the tubular opening of the above type, a cutting tool is rotated and moved downwardly in a gradual helical path to cut and shape the surface to a smooth cylindrical bore. When the bore is completed and the tool has passed completely through the bore it is released from the supporting shank so as to avoid the necessity of drawing it up through the bore, which would score the latter. Heretofore, this release of the cutting tool has been hand-operated or manual.

During the downward passage of the boring tool through the bore, it is guided against vibration and held to a smooth steady course by guides, which closely follow it into the bore. Heretofore, these guides have generally extended only over a short distance longitudinally of the bore, so that, if the cutting tool is required to pass through an enlarged space, the guides were not able to span the latter and the tool entered the lower part of the bore without being held against vibration. In some cases, where the guides were spring held or operated, it was impossible for the cutter to pass such an enlarged space.

These various disadvantages are obviated in my present invention, which provides guides of sufficient length to span relatively wide spaces and which can automatically assume and rigidly hold the shank of the boring tool in proper alignment in the opening being bored and which also provides means whereby the cutting or boring tool may be automatically released after it has passed through the passage being bored.

The various features of the invention are illustrated by way of example in the accompanying drawings, in which—

Fig. 1 is a side elevation partly in section of a boring device embodying a preferred form of the invention; Fig. 2 is a vertical elevation of the guide elements of the device of Fig. 1; Figs. 3 and 4 are, respectively, cross-sections on lines 3—3 of Fig. 1 and 4—4 of Fig. 2, respectively; Fig. 5 is a vertical section on a larger scale than that of Fig. 1 of the lower part of the boring tool; Fig. 6 is a cross-section taken on line 6—6 of Fig. 5; Fig. 7 is a side view partly in section of the cutter element and Fig. 8 is a vertical section through the upper part of a boring device embodying a modification of the invention.

In the boring device of my invention, a boring head having a number of radially extending cutting tools is detachably mounted on the lower end of a drill stem or spindle. The cutter head is mounted and secured in the lower end of the spindle by means of a projection extending upwardly into the latter and having one or more balls received in recesses and pressed into corresponding recesses in the lower end of the spindle by means of a spring-pressed plunger. Thus, the cutter head is securely held in the lower end of the spindle until it passes through the work, whereupon the plunger is caused to engage and be pushed upwardly by a suitable stop until a groove is brought into alignment with the balls, which thereupon withdraw from engagement in the recesses of the spindle and permit the cutter head to be pushed out of engagement by a spring or other means.

During its passage through the bore, the cutter head is guided or stabilized by spaced non-rotating guides. These guides extend upwardly and are slightly enlarged toward their upper ends or tapered downwardly. Their inner edges rest on suitably inclined surfaces in a sleeve encircling the spindle, the outer surfaces of the guides being vertical and parallel to the inner surface of the bore. The guides may be adjusted to the exact size of the bore made by the cutting tool, so as to support the spindle against sidewise vibration and to hold the cutting tool steady. Or, they may be pressed downwardly by a resilient force, such as fluid or spring pressure.

In the latter case, when the ends of the guides come to contact with the edge of the bore, they are pushed upwardly until they fall within the dimensions of the bore, whereupon they enter the latter, being wedged against the surface and holding the spindle steady. Free downward motion of the guide is permitted because the combined longitudinal and radially inward pressure serves to shift the guides upwardly and reduce their ratio with respect to the center of the spindle. The taper is, however, so gradual that sidewise or radially inward pressure cannot displace these guides.

Referring more particularly to Figs. 1 and 2 in the accompanying drawings, the invention is described as applied to a boring tool rotatably supported from a spindle 10 in a supporting head 11 of the boring machine and extending downwardly toward a guide bushing 12 and a work piece 13. The spindle 10 is rotatably supported in the boring head 11 by means of ball or anti-friction bearings 14. The bearings 14 are held in position in the head 11 by means of a plate 15 secured with screws 16. A washer 17 may close the space between the spindle 10 and the plate 15.

Extending downwardly from a short distance below the washer 17 is a guide tube 18. In the embodiment shown in Fig. 1, this tube 18 is threaded at its upper end into a bushing 19, which is supported by spider arms 20 carried by and moved vertically by pneumatic piston rods or stems 21 of pneumatic or fluid pressure cylinders 22. The cylinders 22 may be supplied with pressure fluid to force them downwardly during the boring operation and thereafter be supplied with upwardly acting fluid pressure to free the guide.

The lower end of the sleeve 18 is provided with circumferentially spaced recessed notches 23, three being shown by way of example at intervals of 120°. In each of these notches, is inserted the T-shaped upper end of a downwardly extending guide 24. The outer faces of the guides 24 are slightly rounded to correspond with the curvature of the guide bushing 12 and the bore piece 13 and their side faces are approximately parallel. The inner face of each guide is slightly tapered downwardly and rests against a similarly inclined surface of a groove 25 in a lower guide sleeve 26 which moves vertically with the sleeve 18 and spindle 10. It will, therefore, be apparent that there are three guides and three grooves in the sleeve 26 equally spaced about the circumference of the sleeve to form properly spaced guide surfaces. It will be apparent that when fluid pressure acts downwardly on the cylinders 22 and thence on the sleeve 18, it tends to force the guides 24 downwardly and outwardly.

It will be apparent that when the supporting head 11 is lowered, carrying with it the drill spindle 10, the pneumatic cylinders 22 will be lowered accordingly. The sleeve 26 is held in fixed position on the spindle 10, being held between an enlarged part of the lower end of the spindle and a washer 32 so that it moves longitudinally with the spindle, but remains stationary while the spindle rotates. As the head 11 of the spindle 10 approaches the work, but before coming in contact with it, the pneumatic pressure in the cylinders 22 will force the sleeve 18 and the guides 24 resiliently downwardly to their lowermost position. As the tool head enters the work and the lower ends of the guides 24 come into contact with the guide ring 12, they will be held while the spindle is lowered a short additional distance until they move inwardly to correspond exactly with the internal dimensions of the guide ring 12. Thereupon they will move downwardly with the spindle 10 and the sleeve 26 and at the same rate, the guide openings being of uniform diameter. When the tool spindle is to be withdrawn, the pressure within the cylinders 22 is reversed to draw the sleeve 18 and the guides 24 upwardly to their uppermost position, thus contracting them to a diameter less than that of the guide ring 12 and permitting the tool spindle to be freely drawn upwardly.

The outward pressure of the guides 24 will be magnified and thus rendered effective to hold the guide sleeve rigidly in the bore. When the guide sleeve moves downwardly, the ends of the guides 24 will engage the edge of the bushing 12 and be held while the sleeve 26 moves downwardly, so that the three guides draw inwardly or contract until they reach the exact inner dimensions of the bore, whereupon they slide downwardly, following the lower ends of the boring spindle.

For convenience, in manufacture and assembly, the boring spindle is made of two parts, a lower part 27 having an upper end projecting into a recess 28 in the lower end of the stem 10. The upper part of the stem 27 is threaded into the lower end of the recess 28, as at 29 and is prevented from turning therein by means of a pin 30, which extends through a suitable opening in the lower recessed end of the stem 10 and through a bifurated upper end of the spindle 27. Openings 31 in the sleeve 18 enable the pin 30 to be inserted after the stem 27 has been threaded into the recess 28 and the opening in the stem 10 is brought into alignment with the openings 31. A lock washer or nut 32 also serves to prevent the spindle 27 from turning in the threaded end of the recess 28.

A pair of lock washers 33 and 34 are also provided on the threaded portion of the spindle 27 and a pair of thrust-bearing plates 35 and 36 are provided between the washer 34, which rotates with the spindle 27 and the upper surface of the stationary sleeve 26. An opening 37 is provided in the sleeve 18 to tighten or adjust the lock washers.

The lower end of the spindle 27 is enlarged as at 38 to form a bearing surface with the lower end of the sleeve 26. Preferably, the sleeve 26 has a rotatable or bearing engagement with the spindle 27 at the upper end of the sleeve 26, as at 39 and the lower end, as at 40, being reduced between these enlarged bearing surfaces to form a space 41.

The lower end of the spindle 27 is recessed upwardly and into this recess there is received the upwardly projecting stem 42 of a cutter head 43. The cutter head 43 and stem 42 have a vertical bore, in which is received a vertically slidable plunger 44 having a reduced zone 45. A pair of diametrically spaced cross-passages or openings, shown at 46, Fig. 6, in the stem 42 carry a pair of balls 47, which are pressed by the plunger 44 partly into recesses 48 in the lower end of the spindle 27, so as to lock the stem 42 rigidly in position on the stem 27. The plunger 44 is normally pressed downwardly to the position shown in Fig. 1 by means of a spring 49 in a recess in the upper end of the plunger and acting against the lower end of a rod 50, the upper end of which reacts against the upper end of the recess in the spindle.

It will, therefore, be apparent that the plunger 44 will be held downwardly in the locking position of Fig. 1 until its lower end comes into contact with a fixed stop, shown in Fig. 5, whereupon it will be pushed upwardly until the reduced zone 45 reaches the level of the cross-passage 46 and balls 47, whereupon the latter will be pressed partly into the reduced zone, freeing the stem 42 from the lower end of the spindle, whereupon the cutter head will be forced out of the spindle by the pressure of a spring 51 compressed between the upper end of the stem 42 and the upper surface of the spindle recess.

The cutter head may be of any suitable type. The construction shown in Figs. 1, 3 and 5 is desirable as it provides for the rigid support and ready adjustment of a number of circumferentially spaced cutting tools. In this construction, each cutting tool 52 is held in a radially extending slot or space, the inner ends of the cutting tools abutting the cam surfaces of a multiple cam element 53 having a cam surface for each cutting tool. The cutting tools and cam are clamped into position between the lower surface of the cutter head 43 and a supporting plate 54, by suitable means, such as the screws 55 shown in section in Fig. 3. The cam 53 has a projection 56 downwardly about the plunger 44.

which projection is of a hexagonal or other polygonal shape, so it may be engaged by a wrench and rotated to adjust the radially outward position of the cutters 52.

It will be apparent from the above that as the spindle 10 is rotated and the boring head 11 lowered, the cutting tools 52 will pass within the guide bushing 12 and as they enter the bore 13 the vertical guides 24 will engage the upper edge of the bushing 12. Further downward movement of the boring head 11 will cause a relative upward movement of the guides 24 on the sleeves 26 and corresponding inward movement until the spacing of the guides is just sufficient to permit them to enter the bushing. Thereafter, the guides 26 will follow the bore made by the cutter and are of sufficient length to span the passages or large spaces through which the bore may extend. In any event, the guides will adapt themselves by longitudinal and inward pressure to any suitable bore and will then wedge the guide sleeve in the bore. When the cutter head has finished and passed through the bore, the relatively upward movement of the plunger 44 by engagement with the fixed stop releases the cutter head so that the spindle may be brought upwardly without scoring the inner surface of the bore. It will be apparent that with the above arrangement the guide is self-adjusting under all circumstances and no manual operation is required to adjust this guide nor to release the cutting tool.

It will be noted that the sleeve 26 is held in fixed vertical relation to the spindle 27 between the bearing plates 35 and 36 and the bearing surface 40 and is kept from rotation by its engagement through the guides 24 with the sleeve 18.

A somewhat different arrangement is shown in Fig. 8, in which the upper end of the sleeve 18 is not supported by a pneumatically or fluid pressure actuated device, but is threaded into a manually adjustable ring 58, which is held in fixed relation relative to the spindle 10 between a shoulder 59 on the spindle 10 and a collar 60 threaded on to the stem 10 and engaging the upper end of the sleeve 58. Thrust bearing washers 61 are provided between the collar 60 and the upper end of the sleeve 58 and similarly bearing washers are provided between the shoulder 59 and the shoulder or shelf 63 on the sleeve 58. It will be apparent from the above, that by rotating the sleeve 58, the sleeve 18 may be adjusted vertically relative to the spindle 10 until the periphery of the guides 24 come to the proper dimension, whereupon the sleeve 58 may be tightened by a bolt indicated in section at 58ª to grip the sleeve 18 in the adjusted position.

The thrust bearings 35, 36, 61 and 62 may be of any suitable type, such as ball roller bearings, where space permits. The bearing plates shown being merely conventional.

The guides 24 are readily removable so that they may be replaced by guides of different dimensions to accommodate the apparatus through bores of different sizes. In the above invention, it will be apparent that the cutter head may be readily inserted before the boring is started and will be automatically released when the boring is completed. Also that in the embodiment shown in Fig. 1 the guides will require no adjustment, but will automatically take a position corresponding to the dimensions of the bore and will retain these positions against any sidewise pressure. The lower ends of the guides may be slightly tapered so that they will enter the bore more readily.

What I claim is:

1. Apparatus for boring which comprises a tool-holding spindle having tool holding means at one end, a guide sleeve encircling and guiding said spindle, said sleeve having longitudinally extending grooves at circumferentially spaced intervals, the bottoms of said grooves sloping radially outwardly toward the tool end thereof, guides one for each groove and fluid pressure means to hold said guides against longitudinal movement on said sleeve.

2. Apparatus for boring which comprises a tool-holding spindle having tool holding means at one end, a guide sleeve encircling and guiding said spindle, said sleeve having longitudinally extending grooves at circumferentially spaced intervals, the bottoms of said grooves sloping radially outwardly toward the tool end, guides, one for each groove, and means comprising a sleeve slidable longitudinally relative to said spindle and interlocking with said guides to hold said guides against longitudinal movement on said sleeve and fluid pressure means to move said sleeve and guides longitudinally in either direction.

3. Apparatus for boring which comprises a tool holding spindle having a free tool holding end, a guide sleeve encircling and guiding said spindle and moving with said spindle in fixed longitudinal position on said spindle, said spindle being freely rotatable within said guide sleeve, said sleeve having longitudinally extending grooves at circumferentially spaced intervals on its outer surface, the bottoms of the grooves sloping radially outwardly towards the tool holding end, guides, one for each groove, and means to hold said guides against longitudinal movement on said sleeve and pneumatic means to move said guides toward the tool end of said spindle when said spindle is advanced, and in the opposite direction when it is withdrawn.

JAMES A. EDEN.